June 26, 1923.                   1,460,229
F. H. DEAL
JACK
Filed Feb. 14, 1922          2 Sheets-Sheet 1
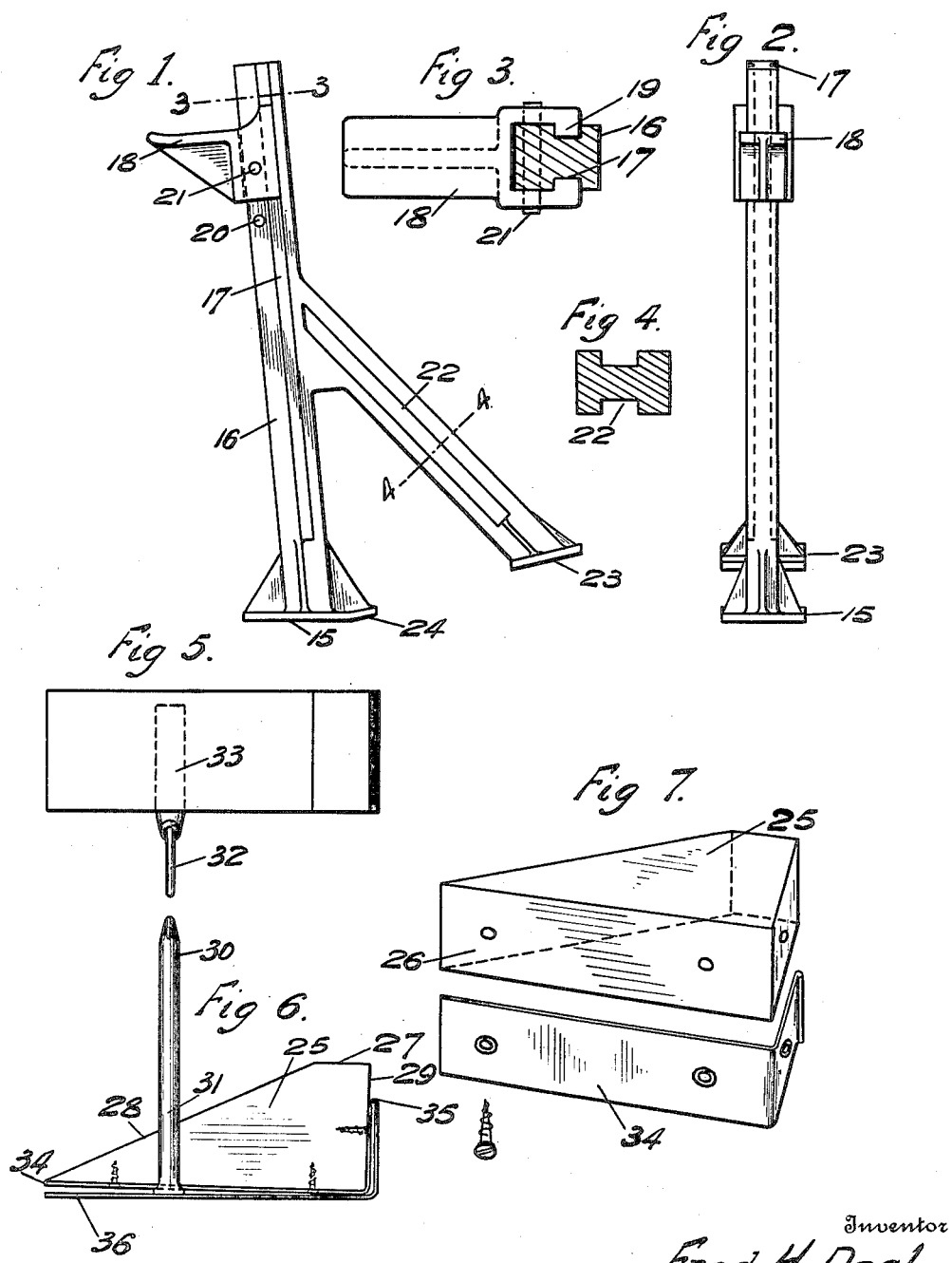

June 26, 1923.
F. H. DEAL
JACK
Filed Feb. 14, 1922
1,460,229
2 Sheets-Sheet 2
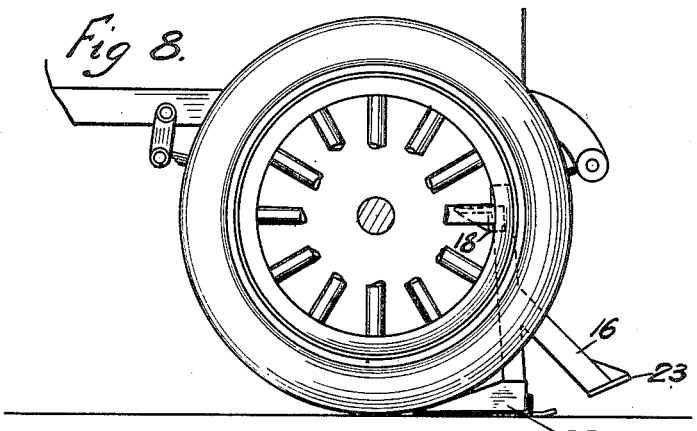
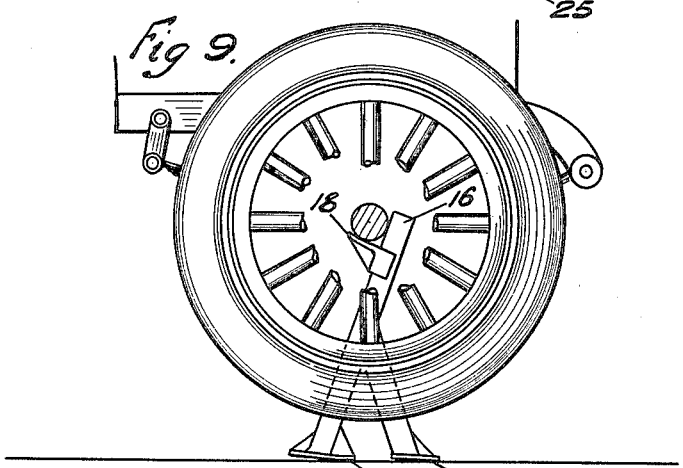
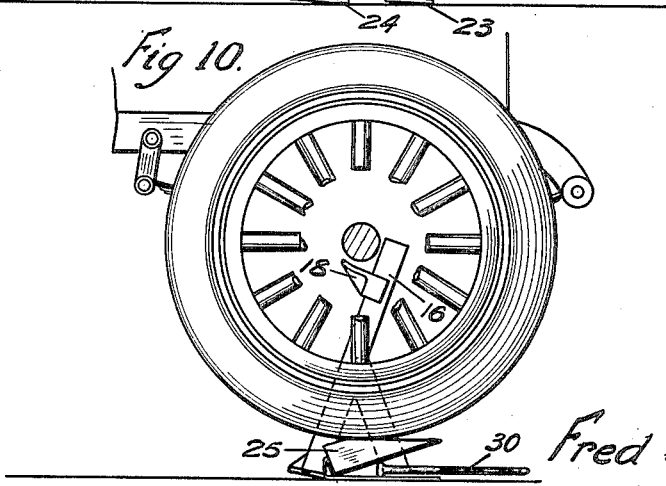
Inventor
Fred H. Deal
By
Attorney Patented June 26, 1923.

1,460,229

UNITED STATES PATENT OFFICE.

FRED H. DEAL, OF BRIDGETON, NEW JERSEY.

JACK.

Application filed February 14, 1922. Serial No. 536,605.

*To all whom it may concern:*

Be it known that I, FRED H. DEAL, a citizen of the United States, residing at Bridgeton, in the county of Cumberland and State of New Jersey, have invented new and useful Improvements in Jacks, of which the following is a specification.

The present invention relates to apparatus for elevating the axle of a vehicle so that a wheel thereon may swing free of the ground.

Objects of the invention are simplicity and durability of construction.

Another object of the invention is to produce a device which may be readily transported from place to place and which may be stored in comparatively little space within the vehicle in connection with which it is to be used.

Another object of the invention is to produce a device which will cooperate with the power of a vehicle in raising the axle, as above set forth, without the necessity of the operator getting under the machine or putting forth any human exertion in raising the wheel from the ground.

Another object is to produce a device free of delicate and breakable parts and which will support the axle in stable equilibrium.

Fig. 1 is a side view of a jack built in accordance with my invention;

Fig. 2 is a view of the jack looking at the same from the left as shown in Fig. 1;

Fig. 3 is a detail view, partly in section on line 3—3 of the supporting arm for the axle of a vehicle showing its sliding connection with the upright of the jack;

Fig. 4 is a section through the leg of the jack on line 4—4;

Fig. 5 is a plan view showing an elevating block to be used in connection with the jack and showing a lever adapted to be used with said block in dismounting the axle from said jack;

Fig. 6 is a side view of the block and lever;

Fig. 7 is a perspective view of the block with the metal plate removed and partly broken away and illustrating the manner of attaching the plate to the block;

Fig. 8 shows the wheel of an automobile advancing onto the block and the jack in position to receive the axle of the wheel when sufficiently advanced upon the block;

Fig. 9 shows the position of the jack when the axle is supported thereon; and

Fig. 10 shows the position of the block and operating lever in relation to the jack when the wheel is being dismounted from the jack.

Referring to the drawings in detail by reference characters, 15 designates a base with which may be integrally formed an upright 16, the upright being preferably inclined at an angle to the base member and the inclination being forwardly or toward the vehicle when the jack is set up for use, the purpose of which will later appear.

In order to adapt the jack for axles of various heights from the ground, the upright 16 is provided on its sides with parallel longitudinally extending grooves 17 and an arm 18 adapted to receive an axle of the vehicle which is provided with tongues 19 slidable in said grooves. Apertures 20 in the upright and a cooperating pin 21 are also provided to secure the arm in various adjusted positions on said upright.

The upright 16 is provided intermediate of its ends with a leg 22 extending rearwardly and downwardly at an angle, the purpose of which will presently appear. The leg may be provided with a base 23 formed on the end thereof and corresponding with the base 15.

In operation, after the axle of the vehicle has been brought into position on the arm 18, the jack is rocked rearwardly by the movement of the vehicle elevating the axle and raising the adjacent wheel off the ground. The rearward movement of the jack continues until the base 23 of the leg 22 contacts with the ground when further rearward movement is arrested. The wheel is elevated when the jack is rocked rearwardly because the relation of the upright and the leg are such that the distance from arm 18 to any point on the line between the bases of the leg and upright is greater than the distance from the arm to the base 15.

In order to facilitate the rearwardly rocking movement of the jack, the base 15 is rounded rearwardly at 24 and when the jack is tilted to the limit of its rearward movement, the weight of the load rests on the rounded portion 24 of the base 15 and on the rear edge of base 23, in this manner distributing the load between the leg and upright.

The jack may be used without accessories by adjusting the arm 18 to such a height that the axle of the vehicle may be brought into position on the arm 18 by simply backing the vehicle along the ground with the jack properly positioned to receive the axle on the arm, and the tilting of the jack alone, as set forth above, may be utilized to elevate the axle. Should it be desired, however, to elevate the axle to a greater height than is possible in this manner, the arm 18 may be adjusted on the upright to a desired height and an accessory used to give the axle an initial elevation to bring it to a level to pass freely onto the arm.

Such an accessory is provided in the form of a block 25, formed with a base 26, a flat top portion 27, an inclined front portion 28, and an abrupt perpendicular rear portion 29 and for running the vehicle on to the jack, the said block is placed rearwardly of the wheel (see Fig. 8) with the inclined portion 28 toward the wheel and in position for the wheel to run up said incline. The jack is at the same time placed in such relation to the block that as the wheel passes up the inclined portion 28 of the block, the axle will be moved to position above the arm 18, and as the wheel passes over the flat portion 27 the jack will be tilted rearwardly, raising the arm into contact with the axle, in this manner preventing a sudden sharp drop of the axle onto the said arm.

The block may also be used to dismount the axle from the jack and in order to adapt it for this purpose, a foot lever 30 may be provided comprising an arm 31 having a pedal 32 at one end and a side extension 33 at the other. The pedal and the extension lying at right angles to the arm 31 and extending in opposite directions therefrom. The extension 33 is flattened so as to adapt it to be slid under the base of the block and to afford leverage in tilting the block when the lever is depressed from the position shown in Fig. 6 to that shown in Fig. 10.

To prevent wear of the block and to prevent the lever from biting into the ground and rendering its turning movement ineffective, a metallic plate 34 is secured to the underside of the block and part way up the rear side, where it is rebent upon itself at 35 and is brought back in parallelism to itself under the block in the form of a tongue 36, hinged at one end, namely on the line 35.

To remove the axle from the jack, the block is placed beneath the wheel with the inclined portion extending rearwardly, (see Fig. 10), the foot lever is then depressed to position as shown, elevating the inclined portion to position to give the wheel traction to run off the jack.

It will be noted from the above description, that I have produced a device for raising a vehicle wheel off the ground and to lower it again, without any considerable manual exertion and without the necessity of getting under the vehicle; one which may be readily transported from place to place which may be used under varied circumstances; which has few parts to get out of order or break and which may be used on front or rear axles; which is simple of construction, easily manufactured and which affords a firm, stable, strong support for the axle when mounted thereon.

I claim:—

1. A jack for raising the wheels of a vehicle off the ground comprising an upright having an arm extending therefrom, a base member attached to the lower end of said upright and adapted to support said upright in equilibrium with the upright tilted forwardly, a leg extending downwardly at an angle from an intermediate portion of said upright and having a base member at its lower end, the base member on said upright being so constructed that when the axle of a vehicle rides onto the arm the jack will be rocked to a position with both bases contacting with the ground.

2. A jack for elevating wheels of vehicles off the ground comprising a base and an upright extending therefrom, said base being adapted to rest in equilibrium on the ground, with the upright extending upwardly at an angle thereto, the upper end of said upright being constructed to receive the axle of a vehicle, a leg extending downwardly at an angle from said upright, the base of said upright being so constructed that it will readily rock to position supporting an axle on said upright and leg.

3. A jack for elevating a vehicle wheel off the ground comprising a base, an upright rigidly attached to said base and extending upwardly at an angle thereto, an axle receiving seat adjacent the upper end of said upright and on the underslope thereof, a leg on the upper slope of said leg extending downwardly from said upright and counterbalancing said seat, the base member being rounded rearwardly so that when a vehicle axle rests upon said seat the upright may be readily rocked to a position with the leg contacting with the ground.

4. A jack for elevating vehicle wheels comprising a base adapted to normally rest flat on the ground, an upright rigidly secured to said base and extending upwardly at an angle to said base, an arm adjustable longitudinally of said upright and extending forwardly of the upper end thereof, a leg extending rearwardly and downwardly at an angle from said upright, said base being so constructed that it may be readily rocked rearwardly to bring the lower end of said leg into contact with the ground, the construction of the jack being such that when it is so rocked rearwardly the position of said arm will be elevated with respect to its position when the base rests flat on the ground.

5. In combination, a jack and a block for elevating wheels of vehicles, said jack comprising a base adapted to normally rest on the ground and to be readily rocked rearwardly, and a forwardly inclined upright secured thereto, said jack having a portion thereof adapted to receive the axle of an automobile, said block having an inclined surface for raising the wheel of a vehicle to bring its axle to a level slightly above said portion of the jack, the base of said jack being rearwardly rounded to facilitate its being rocked rearwardly under the influence of said axle, and a leg on said upright adapted to contact with the ground when the jack is rocked rearwardly.

6. A block to be used in connection with jacks for raising vehicle wheels off the ground, said block having a flat underside, a flat upper portion and an inclined surface extending from said flat undersurface to said flat upper surface, a lever associated with said block and having a flat arm adapted to extend under said block and be turned to elevate said block.

7. The combination of a jack for raising a wheel of a vehicle off the ground and a block for elevating said wheel to bring its axle onto said jack, said block having two surfaces continuous with each other in planes at an angle to each other, and a third surface parallel with one of said first-named surfaces, and said jack being adapted to rock on its base to further elevate said wheel after the axle is brought into position on said jack.

8. The combination of a jack for raising a wheel of a vehicle off the ground and a block for elevating said wheel to bring its axle onto said jack, said block having two surfaces continuous with each other in planes at an angle to each other, and a third surface parallel with one of said first-named surfaces, said jack being adapted to rock on its base to further elevate said wheel after the axle is brought into position on said jack, a sheet metal tongue extending beneath said block and a lever adapted to extend between the third surface and said tongue for raising said block to relieve the jack of said axle.

9. A block for bringing a vehicle axle into position to be received by a jack, said block having a base surface, a surface parallel to the base surface, and a surface inclined to said parallel surfaces, a sheet metal member secured to the base surface and being rebent upon itself to form a tongue lying beneath said base surface, a lever having an operating arm and a flat arm extending at right angles to the operating arm and adapted to be inserted between the tongue and said base surface.

In testimony whereof I have hereunto set my hand in presence of two subscribing witnesses.

FRED H. DEAL.

Witnesses:
WALTER H. BACON, Jr.,
MARY H. ENGLISH.